United States Patent
Wein et al.

(10) Patent No.: US 8,731,759 B2
(45) Date of Patent: May 20, 2014

(54) METHOD FOR OPERATING TWO DRIVES AND MOTOR VEHICLE HAVING TWO DRIVES WHICH OPERATE ON WHEELS DECOUPLED FROM EACH OTHER

(75) Inventors: Michael Wein, Seubersdorf (DE); Tim Meissner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/700,599

(22) PCT Filed: Apr. 27, 2011

(86) PCT No.: PCT/EP2011/002102
§ 371 (c)(1),
(2), (4) Date: Dec. 13, 2012

(87) PCT Pub. No.: WO2011/150998
PCT Pub. Date: Dec. 8, 2011

(65) Prior Publication Data
US 2013/0116873 A1  May 9, 2013

(30) Foreign Application Priority Data
May 29, 2010 (DE) .......... 10 2010 021 996

(51) Int. Cl.
*B60W 20/00* (2006.01)
(52) U.S. Cl.
USPC ............. 701/22; 701/37; 701/67; 701/69; 701/88; 318/99; 318/139; 318/478
(58) Field of Classification Search
CPC ................................... B60W 20/00
USPC ............. 701/22, 37, 67, 69, 88; 318/99, 139, 318/478
See application file for complete search history.

(56) References Cited

U.S. PATENT DOCUMENTS

| | | | | |
|---|---|---|---|---|
| 5,453,930 A * | 9/1995 | Imaseki et al. | .................. | 701/22 |
| 5,804,935 A * | 9/1998 | Radev | ......................... | 318/139 |
| 6,005,358 A * | 12/1999 | Radev | ......................... | 318/139 |
| 6,422,333 B1 * | 7/2002 | Kjær et al. | .................... | 180/197 |
| 6,441,506 B2 * | 8/2002 | Nakashima | ................ | 290/40 C |
| 6,909,959 B2 * | 6/2005 | Hallowell | ....................... | 701/88 |
| 7,389,176 B2 * | 6/2008 | Kadono et al. | ................ | 701/114 |
| 7,739,005 B1 * | 6/2010 | Tang | ............................... | 701/22 |
| 7,937,194 B2 * | 5/2011 | Nasr et al. | ....................... | 701/22 |

(Continued)

FOREIGN PATENT DOCUMENTS

DE  41 33 060 C2  4/1993
DE  198 26 452 A1  12/1999

(Continued)

*Primary Examiner* — John R Olszewski
*Assistant Examiner* — Truc M Do
(74) *Attorney, Agent, or Firm* — Henry M Feiereisen LLC

(57) ABSTRACT

When two (in particular electric) drives operate on wheels decoupled from each other in a motor vehicle, the drives should have an identical construction and the same properties. However, if one drive is stronger than the other, distribution factors other than 0.5 must define the target torque for the two drives, i.e. the fraction of a total torque, in order to provide a correction. The distribution factors are determined while the motor vehicle is in operation. For this purpose, a steering angle and an additional quantity such as the lateral acceleration or the yaw rate are determined and a check is performed to determine if the additional quantity has the correct functional dependency on the steering angle.

5 Claims, 1 Drawing Sheet

(56) References Cited

U.S. PATENT DOCUMENTS

| | | | |
|---|---|---|---|
| 8,285,462 B2* | 10/2012 | Heap et al. | 701/54 |
| 8,321,100 B2* | 11/2012 | Heap | 701/54 |
| 8,332,112 B2* | 12/2012 | Handa et al. | 701/69 |
| 2005/0113168 A1 | 5/2005 | Maeda | |
| 2006/0017414 A1* | 1/2006 | Joe et al. | 318/432 |
| 2007/0038340 A1* | 2/2007 | Sekiguchi et al. | 701/22 |
| 2007/0221425 A1* | 9/2007 | Meissner et al. | 180/233 |
| 2007/0278023 A1* | 12/2007 | Masut et al. | 180/65.5 |
| 2008/0071451 A1* | 3/2008 | Yamaguchi et al. | 701/69 |
| 2008/0210509 A1* | 9/2008 | Fenkart et al. | 192/54.1 |
| 2009/0118924 A1* | 5/2009 | Hsieh et al. | 701/54 |
| 2009/0242289 A1* | 10/2009 | Murty | 180/65.265 |
| 2010/0082188 A1* | 4/2010 | Ando | 701/22 |
| 2010/0222953 A1* | 9/2010 | Tang | 701/22 |
| 2011/0054736 A1* | 3/2011 | Giers et al. | 701/37 |
| 2011/0307129 A1* | 12/2011 | Yu et al. | 701/22 |

FOREIGN PATENT DOCUMENTS

| | | |
|---|---|---|
| DE | 10 2005 034 091 A1 | 1/2007 |
| DE | 10 2005 055 001 A1 | 5/2007 |
| DE | 10 2008 053 113 A1 | 5/2010 |
| GB | 2 351 716 A | 1/2001 |

* cited by examiner

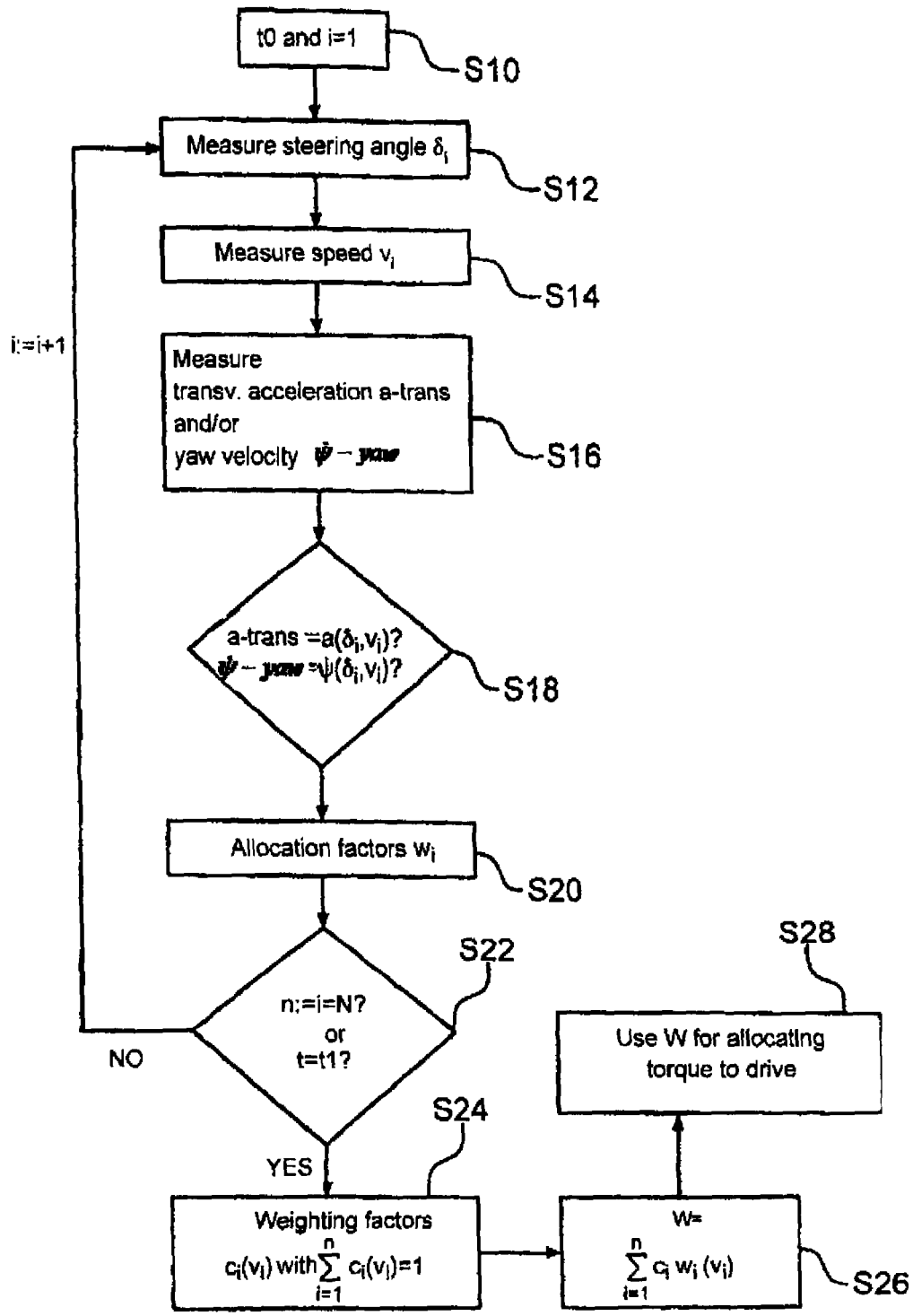

METHOD FOR OPERATING TWO DRIVES AND MOTOR VEHICLE HAVING TWO DRIVES WHICH OPERATE ON WHEELS DECOUPLED FROM EACH OTHER

CROSS-REFERENCES TO RELATED APPLICATIONS

This application is the U.S. National Stage of International Application No. PCT/EP2011/002102, filed Apr. 27, 2011, which designated the United States and has been published as International Publication No. WO 2011/150998 and which claims the priority of German Patent Application, Serial No. 10 2010 021 996.7, filed May 29, 2010, pursuant to 35 U.S.C. 119(a)-(d).

BACKGROUND OF THE INVENTION

The invention relates to a method for operating two drives, in particular electrical drives, which operate on wheels of a vehicle that are decoupled from each other, in particular wheels arranged on different sides of the vehicle. The invention also relates to a corresponding vehicle.

It will be assumed that a control device in the motor vehicle allocates to each of the drives the target torque to be generated by the drives. This control device determines a total torque to be generated and divides this torque into the desired torques. When driving straight ahead, the total torque is normally divided exactly in identical halves of the target torque for the two drives on the different sides of the vehicle. When cornering, the target torque to the outer wheel in the curve can be increased compared to 50:50 split.

It will be assumed that the two drives are constructed identically.

However, due to differences in the drives as a result of tolerances, the same control signal may cause one drive to supply a higher torque than the other drive. While differentials are provided with coupled wheels to effect a compensation, in this situation a balance must be achieved artificially, namely with the control device alone. This control device must then recognize allocation factors, for example, these allocation factors are generally equal to 0.5. However, when a deviation occurs, the weaker drive receives a greater allocation factor of for example 0.55, whereas the stronger drive receives a smaller allocation factor of for example 0.45.

To enable the control device to be aware of these allocation factors, the electric drives had until now to be measured (calibrated) prior to installation into the motor vehicle in a complex process. The allocation factors are then determined in the control device based on the measured values.

The complex measurement before installation is disadvantageous. Another disadvantage is that a subsequent change in the properties of the electric drives is not taken into account.

SUMMARY OF THE INVENTION

It is an object of the invention to eliminate the disadvantages of the prior art and to provide a method, wherein differences in the properties of the two drives are taken into account in a particularly effective manner. It is also an object to provide the appropriate means to implement the method according to the invention.

The object is attained with a method for operating of two drives which operate on mutually decoupled wheels of a motor vehicle, wherein a control device transmits signals to the drives for attaining a desired driving state of the vehicle, with the signals requesting a desired torque to be generated by each of the drives, wherein it is determined based on at least one measurement variable, in particular several times, which actual driving state is attained for which respective desired driving state, and wherein based on a measured value or on measured values, allocation factors concerning the desired relative torques for the two drives to one another are determined for the at least one measurement variable. The object is also attained with a motor vehicle having a first drive, which operates on a first wheel on a left side of the vehicle, and a second drive, which operates on a second wheel on a right side of the vehicle, and having a control device for allocating torque to the drives with predetermined allocation factors, wherein the control device is configured to evaluate measured values obtained during at least one trip and to define the allocation factors depending on the evaluated measured values.

According to the invention, it is determined based on at least one measurement variable, in particular several times, which actual state is achieved for which respective desired state. The allocation factors for the desired torques for the two drives relative to each other are then set based on the measured values.

The inventors of the presently claimed concept have proposed that suitable measured values can be obtained during the ongoing operation of the motor vehicle, from which an account about the existing imbalance between the two (electric) drives can be obtained.

It is feasible to work essentially with estimates. For example, a statistical average value for certain values, such as the transverse acceleration, etc., can be obtained, if necessary, as a function of the vehicle speed.

However, the following procedure is particularly accurate: A measurement variable is a steering angle defined by a steering member of the motor vehicle. Another measurement variable is a variable that varies as a function of this steering angle. This relationship is known. The extent of the deviation of a desired value for the additional measurement variable at the measured steering angle from its actual value is then included in the allocation factors.

The invention is thus based on the observation that an imbalance between the two drives, which is not compensated by the allocation factors, is reflected in a rotation of the motor vehicle. The adjustment of the steering angle is also reflected in the rotation. When measuring variables that depend on the steering angle, the consequences of the rotation introduced by the imbalance are also detected at the same time. For example, the additional measurement variable is preferably a transverse acceleration of the motor vehicle and/or a yaw rate of the motor vehicle.

The motor vehicle according to the invention includes a first drive operating on a first wheel on a left side of the motor vehicle and a second drive operating on a second wheel on a right side of the motor vehicle, and further includes a control device for allocating torque to the drives with predetermined allocation factors (based on a total torque). According to the invention, the control device is configured to evaluate measured values obtained during at least one trip and to define the allocation factors depending on these measured values.

The measured values hereby preferably also relate to the steering angle and another value, such as the transverse acceleration and the yaw rate of the motor vehicle. With the invention, an imbalance between the characteristics of the drives can still be measured after the drives have been installed. This applies particularly to an imbalance that is produced only gradually as a result of the operation.

BRIEF DESCRIPTION OF THE DRAWING

A preferred embodiment of the invention will now be described with reference to the drawing, wherein the only FIG. 1 shows a flow diagram describing an embodiment of the method according to the present invention.

DETAILED DESCRIPTION OF PREFERRED EMBODIMENTS

With the inventive method, a motor vehicle which is not shown in the drawing is assumed to have an electric drive on a left wheel and an electric drive on a right wheel. The method according to the invention is directed to defining allocation weights W, for which 0<W<1, in particular with W approximately equal to 0.5. When a target torque M is to be jointly produced by the two drives, the desired torque W*M is requested from the first drive, whereas the desired torque (1−W)*M is requested from the second drive.

When the drives are constructed identically, W is assumed to be initially exactly equal to 0.5.

The method according to the invention begins at a time to, at step S10, wherein a counter i is set to the value 1.

Subsequently, each time certain events occur, the sequence of steps S12 to S22 is triggered. Alternatively, the steps S12 to S22 may also be performed repeatedly and continuously.

At step S12, the steering angle $\delta_i$ set at a steering member (steering wheel) of the vehicle is measured. The actual speed $v_i$ is then measured at step S14.

Furthermore, at step S16, the transverse acceleration a-trans or alternatively or additionally the measured $\dot{\psi}$−yaw are measured with a suitable sensor.

In the motor vehicle according to the invention, the transverse acceleration a-trans as a function of the steering angle $\delta_i$ and as a function of the speed $v_i$ would now have to adjust to a certain value $a(\delta_i, v_i)$. Likewise, the yaw rate ω-yaw would also have to adjust to a certain value $\omega(\delta_i, v_i)$.

At step S18, it is checked for all values measured at step S16, whether the actually measured value corresponds to the theoretical value.

When this is the case, there is nothing left to do, and this aspect of the process is not shown in the drawing. In the present example, it will be assumed that fundamentally at least at minimal discrepancy exists between a-trans and $a(\delta_i, v_i)$, and between $\dot{\psi}$−yaw and $\omega(\delta_i, v_i)$, respectively.

It can now be quantitatively determined based on a model, to which extent the difference between a-trans and $a(\delta_i, v_i)$ in the actual transverse acceleration relative to the desired transverse acceleration is caused by an imbalance between the two electrical drives. At step S20, allocation factors $w_i$ are computed which are preferably defined such that when the torques are weighted by using these allocation factors $w_i$ as allocation factors W, a transverse acceleration a-trans for that speed or a yaw rate $\dot{\psi}$−yaw for that steering angle δ would result. It should be noted here that an otherwise generated rotation may no longer be produced when the allocation factors are changed. The steering angle $\delta_i$ may also change because the driver is no longer forced to counter-steer. For this reason, the ratio between the additional value of the transverse acceleration a-trans or yaw rate $\dot{\psi}$−yaw and the steering angle $\delta_i$ and/or the functional dependence are considered, rather than only one of these variables alone.

At step S22, it is then checked whether the actual count for the counter variable i, which will be referred to as n, is equal to a final counter reading, meaning that the steps S12 to S20 have been executed N times. Alternatively or in addition, it can be checked whether a predetermined time period has elapsed, for example, whether the time t1 has been reached. The reason for this is that a termination criterion has to be defined for the process. Because certain situations, where the allocation factors $w_i$ can be determined, may depend, on one hand, on the frequency with which the motor vehicle is operated and, on the other hand, the manner in which the driver operates, both termination criteria may also exist in parallel.

When the presence of the termination criterion is not detected at step S22, the counter is incremented by one numerical value. The steps S12, S14, etc., start again at a later time than the present time. This increases not only the total count i, but also the actual time t.

The termination criterion should be selected so that allocation factors $w_i$ are available with adequate frequency in order to be able to make a reliable statement.

At step S24, weighting factors $c_i(v_i)$ are defined for all allocation factors $w_i$ that have been determined so far, because a final allocation factor W should now be calculated and the weighting factors naturally depend on the number of passes of the steps S12 to S22 and hence on the number of allocation factors $w_i$. In the simplest example, the weighting factor is exactly equal to 1/n. A dependence on speed is preferably introduced, since the measured values obtained at higher speeds $v_i$ are particularly significant. Preferably, greater weighting is also preferred for those allocation factors $w_i$ that are obtained for a particularly high torque demand, since in this situation a small percentage deviation leads to a strong vehicle response. When the allocation factors $w_i$ are selected so that could generally be used as the allocation factor W, the weighting factors $c_i(v_i)$ are preferably selected so that the sum of $$\sum_{i=1}^{n} c_i(v_i)$$

is equal to 1.

W is not calculated as $$W = \sum_{i=1}^{n} c_i w_i(v_i),$$

see step S26.

This variable W is subsequently used to allocate torque to one drive; the allocation factor 1−W is used for the other drive.

The inventive process can—which is not shown in the figure—be essentially continuously repeated, wherein the actual allocation factor W is always used and periodically replaced with a new allocation factor W'. In this way, the allocation factor can always be re-adjusted during continuous operation of the motor vehicle, so that changes in the characteristics of the drive during the operation of the motor vehicle are immediately reflected in the allocation factors and the vehicle always drives safely—i.e., so that the transverse acceleration and the yaw rate are optimally, and as accurately as possible, matched to the steering angle. In other words, a rotation that is not desired by the driver is not introduced into the motor vehicle, and the driver is then also not forced to counter-steer to prevent a rotation.

The invention claimed is:

1. A method for operating two drives which operate on mutually decoupled wheels of a motor vehicle, comprising:
    transmitting with a control device to the drives signals requesting a desired torque to be generated by each of the drives, so as to attain a desired driving state of the motor vehicle, determining with the control device, based on a measurement variable represented by a steering angle set by a steering member of the motor vehicle and an additional measurement variable different from the steering angle, said additional measurement variable varying as a function of the steering angle, an actual driving state of the motor vehicle and correlating the actual driving state with the desired driving state, determining with the control device, based on at least one measured value associated with the at least one measurement variable, allocation factors for allocating a desired partial torque for each of the two drives, wherein a magnitude of a deviation of a desired value of the additional measurement variable from an actual value of the additional measurement variable at the set steering angle enters into the determination of the allocation factors, executing the previous method steps a plurality of times, wherein weighting factors are defined each time for each allocation factor, said weighting factors depending on at least one of vehicle speed and torque demand, wherein the allocation factors are weighted by the weighting factors and a final allocation factor for each of the two drives is computed by summing the allocation factors determined in each execution after multiplication of the allocation factors with the weighting factors, with the proviso that a sum of the weighting factors is equal to one, and allocating with the control device the desired partial torque to each of the two drives based on the determined final allocation factor.

2. The method of claim 1, wherein the at least one measured value is determined several times.

3. The method of claim 1, wherein the additional measurement variable is at least one of a transverse acceleration of the motor vehicle and a yaw velocity of the motor vehicle.

4. A motor vehicle, comprising:
a first drive, which operates on a first wheel on a left side of the vehicle,
a second drive, which operates on a second wheel on a right side of the vehicle, and
a control device allocating from a total torque a first partial torque to the first drive and a second partial torque to the second drive commensurate with predetermined allocation factors, wherein the control device is configured to determine, based on a measurement variable represented by a steering angle set by a steering member of the motor vehicle and an additional measurement variable different from the steering angle, said additional measurement variable varying as a function of the steering angle, which actual driving state of the motor vehicle is attained for which desired driving state, to evaluate measured values of the at least one measurement variable obtained during at least one trip of the motor vehicle, to define the allocation factors depending on the evaluated measured values, wherein a magnitude of a deviation of a desired value of the additional measurement variable from an actual value of the additional measurement variable at the set steering angle enters into the determination of the allocation factors, to perform the allocation a plurality of times and defines each time weighting factors for each allocation factor, said weighting factors depending on at least one of vehicle speed and torque demand, to weight the allocation factors with the weighting factors and to compute a final allocation factor for each of the two drives by summing the allocation factors determined in each execution after multiplication of the allocation factors with the weighting factors, with the proviso that a sum of the weighting factors is equal to one, and to allocate the desired partial torque to each of the two drives based on the determined final allocation factor.

5. The motor vehicle of claim 4, wherein the at least one measured value is determined several times.

* * * * *